US007531484B2

(12) United States Patent
Cole et al.

(10) Patent No.: US 7,531,484 B2
(45) Date of Patent: May 12, 2009

(54) METHODS AND SOLUTIONS FOR REMOVING HEC-BASED CFLA FROM A SUBTERRANEAN FORMATION

(75) Inventors: R. Clay Cole, Duncan, OK (US); O. Marlene Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 393 days.

(21) Appl. No.: 10/304,537

(22) Filed: Nov. 26, 2002

(65) Prior Publication Data

US 2004/0102333 A1 May 27, 2004

(51) Int. Cl.
*C09K 8/86* (2006.01)
(52) U.S. Cl. .................. 507/260; 507/273; 507/276; 507/277
(58) Field of Classification Search ................. 507/103, 507/138, 203, 260, 267, 929; 166/312
See application file for complete search history.

(56) References Cited

U.S. PATENT DOCUMENTS

| 3,879,298 | A | * | 4/1975 | Walker | 507/103 |
|---|---|---|---|---|---|
| 3,879,299 | A | * | 4/1975 | Walker | 507/103 |
| 4,537,684 | A | * | 8/1985 | Gallup et al. | 210/696 |
| 4,982,793 | A | | 1/1991 | Holtmyer et al. | 166/305.1 |
| 4,986,356 | A | * | 1/1991 | Lockhart et al. | 166/300 |
| 5,122,549 | A | | 6/1992 | Holtmyer et al. | 523/130 |
| 5,145,515 | A | * | 9/1992 | Gallup et al. | 75/712 |
| 5,191,931 | A | | 3/1993 | Himes et al. | 166/282 |
| 5,304,620 | A | | 4/1994 | Holtmyer et al. | 527/310 |
| 5,354,786 | A | | 10/1994 | Lau | 523/130 |
| 5,944,106 | A | | 8/1999 | Dalrymple et al. | 166/281 |
| 6,138,760 | A | * | 10/2000 | Lopez et al. | 166/300 |
| 6,165,947 | A | | 12/2000 | Chang et al. | 507/216 |
| 6,422,314 | B1 | | 7/2002 | Todd et al. | 166/312 |
| 2004/0200619 | A1 | * | 10/2004 | Rae et al. | 166/307 |

FOREIGN PATENT DOCUMENTS

GB   2 127 394 A   4/1984

OTHER PUBLICATIONS

Table of pKA data obtained from www.zirchrom.com.*
Internet Web page article entitled "Drilling, Workover & Completion Fluids," Messina Inc., published at www.messina-oilchem.com, 7 pp. (2000).
Dobson, et al. "Laboratory Development and Field Application of a Novel Water-Based Drill-In Fluid for Geopressured Horizontal Wells," Society of Petroleum Engineers, Inc. SPE 36428: 1-9 (1996).

* cited by examiner

*Primary Examiner*—Marc S Zimmer
(74) *Attorney, Agent, or Firm*—Robert A. Kent; Baker Botts LLP

(57) ABSTRACT

The current invention provides a novel downhole maleic acid solution suitable for restoring fluid permeability to subterranean formations that were previously treated with chemical fluid loss control agents based on hydroxyethyl cellulose polymer. The current invention also provides methods for restoring fluid permeability to subterranean formations that have been treated with chemical fluid loss control agents based on hydroxyethyl cellulose polymer. The methods of the current invention contact the subterranean formation with downhole maleic acid solutions for a period of time sufficient to restore fluid permeability to the formation.

21 Claims, 1 Drawing Sheet

METHODS AND SOLUTIONS FOR REMOVING HEC-BASED CFLA FROM A SUBTERRANEAN FORMATION

BACKGROUND OF THE INVENTION

The current invention relates to methods for reducing the viscosity of certain high-viscosity fluid-loss control gels without increasing the likelihood of formation damage. Additionally, the current invention provides novel acid solutions for removing high-viscosity fluid-loss control gels from a subterranean formation. Accordingly, the current invention provides solutions and methods for restoring fluid permeability to subterranean formations that have been treated with chemical fluid loss control agents based on hydroxyethyl cellulose (HEC) polymers and derivatives prepared from HEC polymers. For the purposes of this disclosure, all such fluid loss control agents are referred to as HEC-based CFLA.

Key factors to achieving profitable production of oil and gas from subterranean formations include obtaining clear unobstructed perforations in well casing and maintaining an undisturbed formation behind the perforations. The ability to complete the process of perforating a well casing has improved to the point that large diameter clear holes in the casing are readily achieved. This advancement in hydrocarbon production has been achieved in part by the use of clear completion brines in place of mud products during perforation operations. However, the resulting immediate communication between the formation and the wellbore requires immediate control of fluid flow between the wellbore and the formation. If the density of the completion brine is too low, then the well may uncontrollably blow oil and gas up the casing. In contrast, if the brine density is too high, then the brine flows uncontrollably into the oil and gas bearing formation. Ideally, an absolute balance of wellbore fluid hydrostatic pressure against the pressure exerted by the fluids inside the formation would leave the well accessible and serviceable. Trying to maintain such a balance is dangerous and tricky due to the changing hydrostatic dynamics within deep petroleum wells. The safe option is always to make the wellbore brine heavy enough to overcome the formation pressure. However, achieving this balance increases the potential of detrimental interaction of the brine with the sensitive minerals of the formation. In fact, literature citing the need to limit the contact of brine with oil and gas bearing formations is readily available.

Common products employed to preclude the entry of brine into adjacent formations typically yield very high viscosity crosslinked gels in wellbore brines. Known as chemical fluid loss control agents (CFLA), the most common products utilize hydroxyethyl cellulose (HEC) polymer or chemically modified HEC polymer. In a typical application these gelled brine products, also known in the art as fluid loss control pills, reside in only a small area inside the wellbore adjacent to the perforations. In some cases the pills enter the perforations and the matrix of the perforated formation. Prior to initiating production from the formation, these fluid loss pills must be removed as completely as possible because they have the potential to restrict hydrocarbon production from the formation.

HEC-based CFLA responds to an acid environment by either uncrosslinking or by the polymer molecule breaking apart. The uncrosslinking or breaking lowers the viscosity of the gel pill. Following the reduction in viscosity, the HEC-based CFLA flows out of the formation thereby permitting fluid flow in either direction. In particular, a very effective acid used to achieve the uncrosslinking and breaking of the polymer gels is hydrochloric acid. Typically, the HCl is dissolved in brine to yield an acid concentration of 10% or less. Usually the HCl solutions completely remove the fluid loss pills in thirty to sixty minutes. Even though hydrochloric acid provides efficient and rapid removal of the fluid loss pills, the industry has reluctantly accepted the use of HCl solutions. A continued concern exists that the mineralogy of certain formations containing the zeolite family of clays responds to the presence of HCl by producing silica gel by-products. These by-products permanently damage the matrix of the formation where the fluid loss pill once resided. Therefore, a reluctance to use HCl acid solutions has emerged. Alternatively, the solutions have been so diluted as to be ineffective. Testing of alternative solutions such as organic acids and organic acid blends indicates that such solutions cause minimal formation damage; however, these solutions do not adequately remove all traces of HEC-based fluid loss polymer gels.

Therefore, a need exists for a breaker solution capable of providing the gel breaking ability of HCl acid solutions while substantially reducing the potential for by-product damage to the formation.

SUMMARY OF THE INVENTION

The current invention provides methods and solutions for removing HEC-based CFLA from a subterranean formation. In one embodiment, the downhole solutions comprise.

In another embodiment, the downhole solutions comprise from about 5 to about 50 percent by weight maleic acid dissolved in water. The downhole solution has at least one salt selected for its ability to preclude water take-up by the subterranean formation. Additionally, the downhole solution optionally contains from one to three percent by weight of a performance-enhancing compound. Preferably, the solution has a density between about 8 pounds per gallon and about 14 pounds per gallon.

In yet another embodiment, the current invention provides downhole maleic acid solutions formed by dissolving maleic acid in fresh water, seawater or brine solutions. The maleic acid comprises from about 5 to about 50 percent by weight of the solution. Further, the solution may optionally comprise from one to three percent by weight of a performance-enhancing agent in the form of a pH lowering compound such as but not limited to hydrochloric acid or an oxidizing agent such as but not limited to sodium perborate. Brines suitable for forming the downhole maleic acid solution include but are not necessarily limited to potassium chloride, calcium bromide, sodium chloride, sodium bromide, calcium chloride, a mixture of calcium chloride and calcium bromide, and mixtures thereof. Additionally, the downhole maleic acid solution may include salts such as but not limited to sodium chloride, calcium chloride, ammonium chloride, magnesium chloride, calcium bromide, potassium bromide, potassium chloride and mixtures thereof. The inclusion of such salts improves the ability of the solution to protect the integrity of the formation during the acid treating process. The use of these salts precludes water take up by the clay compounds of the subterranean formation. Additionally, the preferred solutions will have densities between about 8 pounds per gallon and about 14 pounds per gallon. Solutions of the current invention are particularly effective in removing HEC-based CFLA.

The current invention also provides improved methods for removing HEC-based CFLA from a subterranean formation. The improved methods of the current invention comprise the steps of preparing a downhole maleic acid solution having a density at least equal to the HEC-based CFLA to be removed from the subterranean formation. The method includes the preparation of a downhole maleic acid solution by dissolving sufficient maleic acid in fresh water, seawater or brine to yield a solution comprising from about 10 percent by weight to 50 percent by weight maleic acid. Examples of brines suitable for use in the method of the current invention include: potassium chloride, calcium bromide, sodium chloride, sodium bromide, calcium chloride, a mixture of calcium chloride and calcium bromide, and mixtures thereof. Further, the method of the current invention may include the addition of a performance-enhancing agent in the form of a pH lowering compound such as but not limited to hydrochloric acid or an oxidizing agent such as but not limited to sodium perborate to the downhole maleic acid solution. An optional step in the method of the current invention includes the addition of the salts such as but not limited to sodium chloride, calcium chloride, ammonium chloride, magnesium chloride, calcium bromide, potassium bromide, potassium chloride and mixtures thereof to the downhole maleic acid solution. Typically, sufficient salt will be added to yield a solution containing 7 percent or more salt by weight. The addition of the salt improves the formation protecting ability of the downhole maleic acid solution by precluding water take-up by clays in the subterranean formation. The method of the current invention also includes a density adjustment step whereby the density of the maleic acid solution is adjusted to be at least equal to and preferably greater than the density of the HEC-based CFLA to be removed from the subterranean formation. Following preparation of the downhole maleic acid solution, the method of the current invention circulates the solution downhole into the region of the well occupied by the HEC-based CFLA. The method maintains the downhole maleic acid solution in contact with the HEC-based CFLA for a sufficient period of time to sufficiently lower the viscosity of the HEC-based CFLA to permit hydrocarbon production from the subterranean formation.

Additionally, the current invention provides a method for restoring the fluid flow permeability of a subterranean formation previously treated with a HEC-based CFLA. The method includes the preparation of a downhole maleic acid solution by dissolving sufficient maleic acid in fresh water, seawater or brine to yield a solution comprising from about 5 percent by weight to 50 percent by weight maleic acid. Examples of brines suitable for use as the solvent in the method of the current invention include: potassium chloride, calcium bromide, sodium chloride, sodium bromide, calcium chloride, a mixture of calcium chloride and calcium bromide, and mixtures thereof. Further, as an optional step a performance-enhancing agent in the form of a pH lowering compound such as but not limited to hydrochloric acid or an oxidizing agent such as but not limited to sodium perborate may be added to the downhole maleic acid solution. Typically, the performance-enhancing agent is added when the concentration of maleic acid in the downhole solution is less than 10 percent by weight. In general, the addition of the performance-enhancing agent will improve the removal rate of the HEC-based CFLA from the formation regardless of the concentration of maleic acid in solution. An optional step in the method of the current invention includes the addition of a salt such as but not limited to sodium chloride, calcium chloride, ammonium chloride, magnesium chloride, calcium bromide, potassium bromide, potassium chloride and mixtures thereof to the downhole maleic acid solution. Typically, sufficient salt will be added to yield a solution containing 7 percent or more salt by weight. The method of the current invention also includes a density adjustment step whereby the density of the maleic acid solution is adjusted to be at least equal to and preferably greater than the density of the HEC-based CFLA to be removed from the subterranean formation. Following preparation of the downhole maleic acid solution, the method of the current invention circulates the solution downhole into the region of the well occupied by the HEC-based CFLA. The downhole maleic acid solution remains in contact with the HEC-based CFLA for a period of time sufficient to restore fluid flow permeability to the subterranean formation.

DETAILED DESCRIPTION OF THE INVENTION

Figure 1:
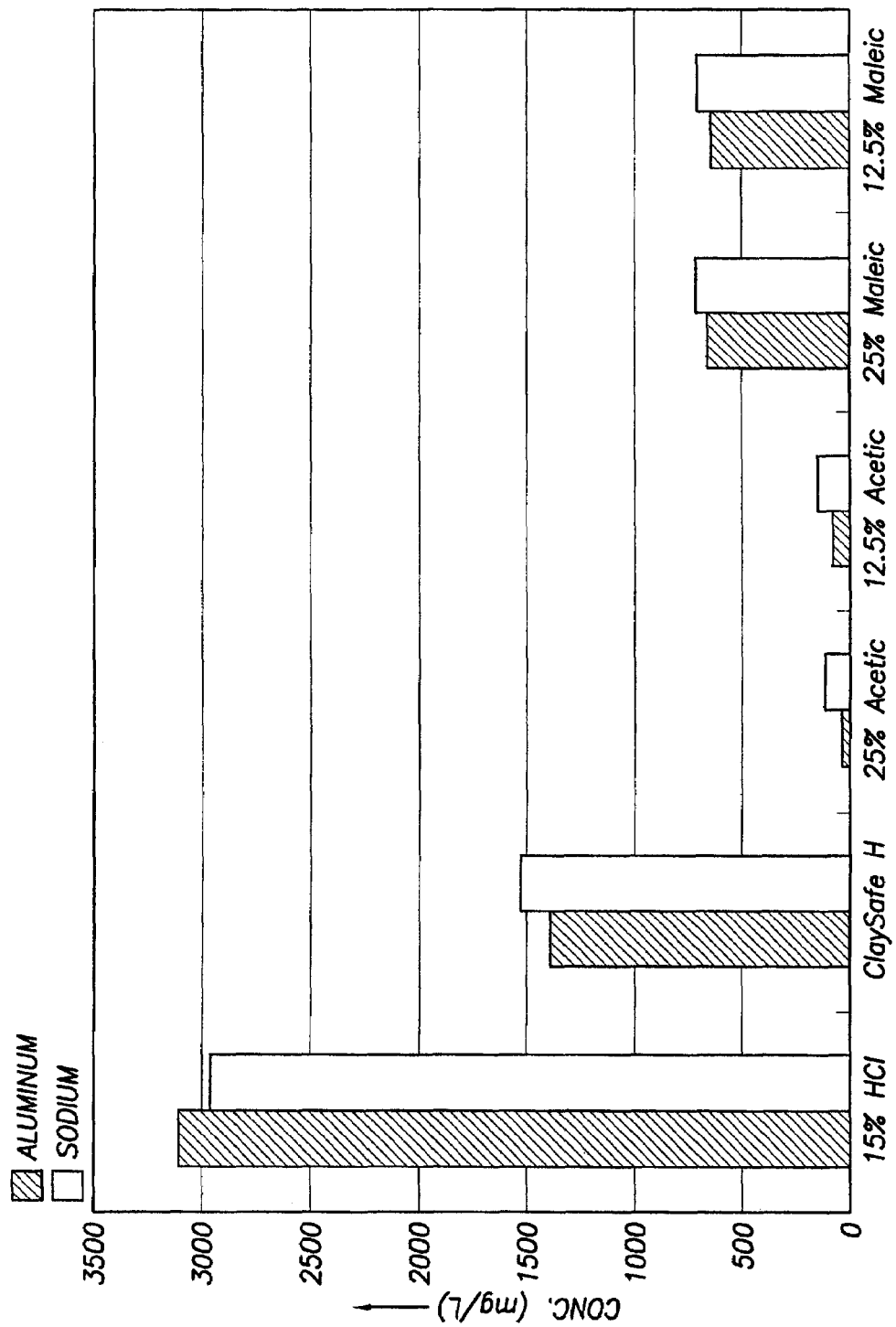
FIG. 1 is an analysis of the filtrate collected after addition of various acid solutions to 1.0 gram of analcime mineral as described in Example 3 of the present invention.

In one embodiment, the current invention provides well treatment solutions suitable for breaking the viscosity of chemical fluid loss control agents (CFLA) used in the downhole environment. The well treatment solutions also provide for the removal of CFLA by displacing and floating the CFLA out of the formation pores. The well treatment solutions of the current invention are particularly effective when removing CFLA based on hydroxyethyl cellulose polymer and derivatives thereof. Examples of such CFLA's are found in U.S. Pat. Nos. 4,982,793, 5,067,569, 5,122,548, and 5,304,620 incorporated herein by reference. As indicated above, the term "HEC-based CFLA" refers to HEC polymers and derivatives prepared from HEC polymers. Solutions of the current invention restore permeability to the producing formation by removing the HEC-based CFLA with little or no damage to the formation and the production equipment.

The well treatment solutions of the current invention comprise solutions of maleic acid. The maleic acid can be dissolved in essentially any clear water available at the well site. For example, fresh water, seawater and brine solutions will suffice to form the maleic acid solutions of the current invention. The downhole solutions of maleic acid comprise from about 5 percent to 50 percent by weight maleic acid. The preferred downhole solutions comprise from about 10 percent to about 40 percent maleic acid by weight.

The downhole maleic acid solutions of the current invention may also include performance-enhancing agents such as a pH lower compound or an oxidizing agent. The addition of a performance-enhancing agent is particularly useful if a maleic acid concentration of 10 percent by weight cannot be achieved. If the concentration of maleic acid in the solution is less than 10 percent by weight, then the addition of a performance-enhancing agent to yield a solution comprising up to 3 percent by weight of the performance-enhancing agent will enhance the gel breaking activity of the maleic acid solution. For example, the addition of hydrochloric acid as a pH lower agent provides a second compound capable of uncrosslinking the polymer.

As known to those skilled in the art, clays commonly found in downhole formation become destabilized when exposed to excess water. As the clay in the formation absorbs water it swells thereby reducing the integrity of the formation. Therefore, in order to enhance the formation protecting characteristics of the downhole maleic acid solutions, the solutions of the current invention may also include salts such as but not limited to sodium chloride, calcium chloride, ammonium chloride, magnesium chloride, calcium bromide, potassium bromide, potassium chloride and mixtures thereof. When included in the maleic acid solutions, the additional salts typically comprise 7 percent or more by weight of the solution. Maintaining the appropriate salt level in the maleic acid solutions reduces the propensity of the clay to take up water thereby enhancing the stability of the formation during the acid treatment process.

In order to function properly in the downhole environment, the maleic acid solutions of the current invention must have a density sufficient to remain in the area of the formation to be treated. Further, it is desirable to provide a maleic acid solution with a density equal to or greater than the CFLA to removed from the formation. Typical CFLA's have densities ranging from about 8 pounds/gallon up to about 14 pounds/gallon. Therefore, the downhole maleic acid solutions of the current invention preferably have densities ranging from about 8 pounds/gallon up to about 14 pounds/gallon. When the maleic acid solution has a density greater than the HEC-based CFLA, the maleic acid solution restores formation permeability by breaking the viscosity of the HEC-based CFLA and by displacing and floating the HEC-based CFLA out of the formation. Typically, the density of the downhole maleic acid must be at least one pound per gallon greater than the density of the HEC-based CFLA in order to float the HEC-based CFLA out of the formation. In order to provide a downhole maleic acid solution having the desired density, the salts described above as being suitable for precluding formation damage, may be added to the solution. Thus, the concentration of the salts within the downhole maleic acid solution can easily exceed 7 percent by weight.

The current invention also provides methods for restoring the permeability of a subterranean formation previously treated with HEC-based CFLA's. The methods of the current invention improve the permeability of a subterranean formation by removing the HEC-based CFLA from the pores of the subterranean formation. The methods of the current invention remove the HEC-based CFLA by reducing, i.e. breaking, the gel viscosity and/or by floating the HEC-based CFLA out of the pores of the formation.

According to the methods of the current invention, a downhole maleic acid solution is prepared by dissolving a sufficient quantity of maleic acid in available water. The concentration of maleic acid in solution may range from about 5 to about 50 percent by weight. Preferably, the final solution will have a concentration of maleic acid ranging from about 10 percent by weight to about 40 percent by weight. In general, the nature of the downhole environment will determine the desired concentration of maleic acid in the downhole maleic acid solution. Factors considered when formulating the downhole maleic acid solution include: downhole temperature, CFLA used, and the composition of the formation. Since cooler temperatures require higher acid concentration in order to provide satisfactory removal times, the temperature of the downhole formation will determine the desired concentration of maleic acid. The water used to form the downhole maleic acid solution may be fresh water, seawater or brine. Thus, most clear water available at the well site will provide a suitable solution.

If the water available at the site will not dissolve a sufficient quantity of maleic acid to yield the desired concentration of maleic acid, then a performance-enhancing agent may be added to the solution. Addition of a performance-enhancing agent is desirable when the maximum concentration of maleic acid soluble in the available water does not achieve the desired removal rate of the HEC-based CFLA. Performance-enhancing agents suitable for use in the downhole maleic acid solution include but are not limited to pH lower compounds such as hydrochloric acid and oxidizing agents such as sodium perborate. The performance-enhancing agent is normally added to the downhole maleic acid solution in quantities up to about 3 percent by weight. When using a pH lower compound, the primary limitation on the quantity of the performance-enhancing agent is that amount which will not damage the downhole formation and/or the production equipment. Addition of the performance-enhancing agent will reduce the time period necessary to restore formation permeability when using downhole maleic acid solutions having less than 10% maleic acid by weight. While the addition of the performance-enhancing agent will also reduce the treatment times of higher concentration maleic acid solutions, the performance-enhancing agent is normally omitted in order to further minimize the likelihood of formation and equipment damage.

In order to protect the integrity of the formation during the permeability restoration process, the current invention also provides for the addition of salts such as but not limited to sodium chloride, calcium chloride, ammonium chloride, magnesium chloride, calcium bromide, potassium bromide, potassium chloride and mixtures thereof to the downhole maleic acid solution. The salts are added to the maleic acid solution in quantities sufficient to reduce the propensity of clay in the subterranean formation to take up water. When included in the maleic acid solutions, the additional salts typically comprise up to about 7 percent by weight of the solution.

The current invention also includes the steps of determining the density of the downhole maleic acid solution and adjusting the density to a level equal to or greater than the density of the CFLA to be removed from the subterranean formation. The current methods of the current invention adjust the density of the downhole maleic acid solution by adding to the solution a sufficient quantity of salts such as, but not limited to, sodium chloride, calcium chloride, ammonium chloride, magnesium chloride, calcium bromide, potassium bromide, potassium chloride and mixtures thereof. Thus, the final concentration of the salts within the downhole maleic acid solution can easily exceed 7 percent by weight.

Following preparation of the downhole maleic acid solution, the methods of the current invention circulates the fluid downhole to the desired formation to be treated. The density of the formation allows the solution to remain in the vicinity of the formation to be treated. As noted above, when the downhole maleic acid solution has a density equal to or greater than the density of the HEC-based CFLA to be removed, the downhole maleic acid solution effectively restores formation permeability by breaking the viscosity of the HEC-based CFLA compound and by displacing and floating the compound out of the formation.

The downhole maleic acid solution remains in contact with the subterranean formation for a period of time sufficient to restore permeability to the formation. The period of time necessary to restoration of permeability will vary with downhole temperatures. In general, lower formation temperatures will require longer contact periods to restore permeability to the formation. Typically, the downhole maleic acid solution will remain in contact with the formation for at least thirty minutes. Preferably, the contact time will be sufficient to restore at least 70 percent of the formation's permeability based on the permeability of the formation prior to treatment with the CFLA. Acid treatments capable of restoring 70 percent or more of the formation's permeability are considered highly effective.

The following examples demonstrate the ability of the downhole maleic acid solutions restore the fluid permeability of subterranean formations treated with HEC-based CFLA's. Example 1 compares the effectiveness of the downhole maleic acid solution in breaking the viscosity of an HEC based CFLA to various organic acids and hydrochloric acid. Example 2 demonstrates the effectiveness of the downhole maleic acid solution in restoring the fluid permeability of downhole formations. Finally, Example 3 demonstrates that the downhole maleic acid solution will remove HEC-based CFLA with minimal or no damage to the formation.

EXAMPLE 1

Static break tests were performed using several acids under varying conditions as reported in Tables 1-6. As shown by the tables, the effectiveness of the acid in breaking the viscosity of the HEC-based CFLA varied greatly. The static break tests were conducted in 4 oz. clear glass bottles. Each test used 50 mL of a fully crosslinked modified HEC-based gel known as K-MAX brand CFLA in a test bottle. K-MAX brand CFLA is available commercially from Halliburton Energy Services, Inc. of Duncan, Okla. The height of the gel was approximately 3.5 cm. Then, 50 mL of the acid to be tested was poured on top of the gel. Following addition of the downhole maleic acid solution to the sample bottle, a clear line of demarcation existed between the acid solution and the HEC-based CFLA. As the viscosity of the HEC-based CFLA decreased, the demarcation line moved down the sample bottle. When the demarcation line was no longer visible, the viscosity was considered to be completely broken. Since the test was designed to merely determine the static break point of the gel a marble was not included in the break tests. The prepared samples were placed in a water bath at the desired temperature. The height of the demarcation line was measured at the times noted in the data tables. The average height of the demarcation line was compared to that at the beginning of the test and the percent break in viscosity was determined based on the original gel height vs. time. Break rates were determined based on the time to eliminate the demarcation line between the downhole acid solution and the HEC-based CFLA. In some instances 100% elimination of the demarcation line was never achieved within the 120-minute maximum test time monitored. Tables 1-6 below report the gel breaking performance of each acid.

TABLE 1

Breaker Compound Used: 31.45% Hydrochloric acid = 20° Be

| | Diluted To: | | | | | | | |
|---|---|---|---|---|---|---|---|---|
| | 5% Conc. | | 10% Conc. | | 15% Conc. | | 20% Conc. | |
| Time, min | cm clear fluid | % of Total | cm clear fluid | % of Total | cm clear fluid | % of Total | cm clear fluid | % of Total |
| Test Temperature: 75° F. | | | | | | | | |
| 4 | 0.45 | 8.18 | 0.45 | 8.18 | 0.55 | 10.00 | 0.43 | 7.82 |
| 10 | 0.66 | 12.00 | 0.66 | 12.00 | 0.81 | 14.73 | 1 | 18.18 |
| 15 | 0.75 | 13.64 | 0.79 | 14.36 | 1.26 | 22.91 | 1.82 | 33.09 |
| 20 | 0.8 | 14.55 | 0.91 | 16.55 | 1.34 | 24.36 | 1.95 | 35.45 |
| 30 | 0.9 | 16.36 | 1.01 | 18.36 | 1.71 | 31.09 | 2.32 | 42.18 |
| 40 | 1 | 18.18 | 1.04 | 18.91 | 1.94 | 35.27 | 2.83 | 51.45 |
| 60 | 1.2 | 21.82 | 1.59 | 28.91 | 5.5 | 100.00 | 5.5 | 100.00 |
| 120 | 1.6 | 29.09 | 2.55 | 46.36 | 5.5 | 100.00 | 5.5 | 100.00 |
| Test Temperature: 140° F. | | | | | | | | |
| 4 | 0.58 | 10.55 | 0.59 | 10.73 | 0.79 | 14.36 | | |
| 10 | 0.86 | 15.64 | 0.86 | 15.64 | 1.43 | 26.00 | | |
| 15 | 0.9 | 16.36 | 0.97 | 17.64 | 2.09 | 38.00 | | |
| 20 | 0.98 | 17.82 | 1.11 | 20.18 | 3 | 54.55 | | |
| 30 | 1.1 | 20.00 | 1.42 | 25.82 | 5.23 | 95.09 | | |
| 40 | 1.62 | 29.45 | 1.8 | 32.73 | 5.5 | 100.00 | | |
| 60 | 1.62 | 29.45 | 2.5 | 45.45 | 5.5 | 100.00 | | |
| 120 | 2.1 | 38.18 | 4.96 | 90.18 | 5.5 | 100.00 | | |
| Test Temperature: 180° F. | | | | | | | | |
| 4 | 0.58 | 10.55 | 0.76 | 13.82 | 0.76 | 13.82 | | |
| 10 | 1.8 | 32.73 | 2.3 | 41.82 | 2.5 | 45.45 | | |
| 15 | 2.7 | 49.09 | 3.3 | 60.00 | 3.55 | 64.55 | | |
| 20 | 3.38 | 61.45 | 3.6 | 65.45 | 4.06 | 73.82 | | |
| 30 | 3.6 | 65.45 | 3.75 | 68.18 | 5.32 | 96.73 | | |
| 40 | 3.8 | 69.09 | 4 | 72.73 | 5.5 | 100.00 | | |
| 60 | 3.8 | 69.09 | 4.4 | 80.00 | 5.5 | 100.00 | | |
| 120 | 4.2 | 76.36 | 5.3 | 96.36 | 5.5 | 100.00 | | |

TABLE 2

Breaker Compound Used: Glacial Acetic Acid

| | Diluted To: | | | | | |
|---|---|---|---|---|---|---|
| | 25% True Conc. | | 50% True Conc. | | 75% True Conc. | |
| Time, min | cm clear fluid | % of Total | cm clear fluid | % of Total | cm clear fluid | % of Total |
| Test Temperature: 75° F. | | | | | | |
| 4 | 0.3 | 5.45 | 0.34 | 6.18 | 0.48 | 8.73 |
| 10 | 0.52 | 9.45 | 0.56 | 10.18 | 0.56 | 10.18 |
| 15 | 0.69 | 12.55 | 0.6 | 10.91 | 0.67 | 12.18 |
| 20 | 0.7 | 12.73 | 0.7 | 12.73 | 0.81 | 14.73 |
| 30 | 0.74 | 13.45 | 0.7 | 12.73 | 0.8 | 14.55 |
| 40 | 0.86 | 15.64 | 0.79 | 14.36 | 0.81 | 14.73 |
| 60 | 0.9 | 16.36 | 0.82 | 14.91 | 0.95 | 17.27 |
| 120 | 0.94 | 17.09 | 0.95 | 17.27 | 1.07 | 19.45 |
| Test Temperature: 140° F. | | | | | | |
| 4 | 0.39 | 7.09 | 0.39 | 7.09 | 0.39 | 7.09 |
| 10 | 0.45 | 8.18 | 0.48 | 8.73 | 0.53 | 9.64 |
| 15 | 0.7 | 12.73 | 0.75 | 13.64 | 0.69 | 12.55 |
| 20 | 0.7 | 12.73 | 0.75 | 13.64 | 0.69 | 12.55 |
| 30 | 0.9 | 16.36 | 0.9 | 16.36 | 0.9 | 16.36 |
| 40 | 1 | 18.18 | 1 | 18.18 | 1 | 18.18 |
| 60 | 1.05 | 19.09 | 1.05 | 19.09 | 1.05 | 19.09 |
| 120 | 1.05 | 19.09 | 1.58 | 28.73 | 1.4 | 25.45 |

TABLE 2-continued

Breaker Compound Used: Glacial Acetic Acid

Diluted To:

| Time, min | 25% True Conc. cm clear fluid | % of Total | 50% True Conc. cm clear fluid | % of Total | 75% True Conc. cm clear fluid | % of Total |
|---|---|---|---|---|---|---|
| Test Temperature: 180° F. | | | | | | |
| 4 | 0.4 | 7.27 | 0.55 | 10.00 | 0.65 | 11.82 |
| 10 | 0.51 | 9.27 | 0.61 | 11.09 | 0.72 | 13.09 |
| 15 | 0.53 | 9.64 | 0.85 | 15.45 | 0.82 | 14.91 |
| 20 | 0.62 | 11.27 | 0.85 | 15.45 | 0.97 | 17.64 |
| 30 | 0.82 | 14.91 | 0.86 | 15.64 | 0.97 | 17.64 |
| 40 | 0.95 | 17.27 | 1.15 | 20.91 | 1.75 | 31.82 |
| 60 | 1.08 | 19.64 | 1.32 | 24.00 | 1.42 | 25.82 |
| 120 | 1.43 | 26.00 | 1.95 | 35.45 | 1.9 | 34.55 |

TABLE 3

Breaker Compound Used: 88% Formic acid

Diluted To:

| Time, min | 22% True Conc. cm clear fluid | % of Total | 44% True Conc. cm clear fluid | % of Total | 66% True Conc. cm clear fluid | % of Total |
|---|---|---|---|---|---|---|
| Test Temperature: 75° F. | | | | | | |
| 4 | 0.36 | 6.55 | 0.38 | 6.91 | 0.4 | 7.27 |
| 10 | 0.55 | 10.00 | 0.74 | 13.45 | 1.2 | 21.82 |
| 15 | 0.6 | 10.91 | 1 | 18.18 | 1.66 | 30.18 |
| 20 | 0.64 | 11.64 | 1.4 | 25.45 | 1.91 | 34.73 |
| 30 | 0.71 | 12.91 | 1.88 | 34.18 | 2.23 | 40.55 |
| 40 | 0.86 | 15.64 | 2.42 | 44.00 | 3.12 | 56.73 |
| 60 | 0.95 | 17.27 | 3.31 | 60.18 | 4.11 | 74.73 |
| 120 | 1.15 | 20.91 | 4.97 | 90.36 | 4.78 | 86.91 |
| Test Temperature: 140° F. | | | | | | |
| 4 | 0.48 | 8.73 | 0.55 | 10.00 | 1 | 18.18 |
| 10 | 0.6 | 10.91 | 1.03 | 18.73 | 2.03 | 36.91 |
| 15 | 0.54 | 9.82 | 1.08 | 19.64 | 2.58 | 46.91 |
| 20 | 0.54 | 9.82 | 1.8 | 32.73 | 3.7 | 67.27 |
| 30 | 0.58 | 10.55 | 3.5 | 63.64 | 5.28 | 96.00 |
| 40 | 1.08 | 19.64 | 3.7 | 67.27 | 5.5 | 100.00 |
| 60 | 1.25 | 22.73 | 5.35 | 97.27 | 5.5 | 100.00 |
| 120 | 1.7 | 30.91 | 5.39 | 98.00 | 5.5 | 100.00 |
| Test Temperature: 180° F. | | | | | | |
| 4 | 0.48 | 8.73 | 0.55 | 10.00 | 1 | 18.18 |
| 10 | 0.6 | 10.91 | 1.03 | 18.73 | 2.03 | 36.91 |
| 15 | 0.54 | 9.82 | 1.08 | 19.64 | 2.58 | 46.91 |
| 20 | 0.54 | 9.82 | 1.8 | 32.73 | 3.7 | 67.27 |
| 30 | 0.58 | 10.55 | 3.5 | 63.64 | 5.28 | 96.00 |
| 40 | 1.08 | 19.64 | 3.7 | 67.27 | 5.5 | 100.00 |
| 60 | 1.25 | 22.73 | 5.35 | 97.27 | 5.5 | 100.00 |
| 120 | 1.7 | 30.91 | 5.39 | 98.00 | 5.5 | 100.00 |
| Test Temperature: 220° F. | | | | | | |
| 4 | 0.43 | 8.53 | 0.99 | 19.37 | 1.15 | 22.03 |
| 10 | 0.9 | 17.86 | 2.26 | 44.23 | 3.89 | 74.52 |
| 15 | 1.08 | 21.43 | 2.26 | 44.23 | 5.22 | 100.00 |
| 20 | 1.2 | 23.81 | 3.08 | 60.27 | 5.22 | 100.00 |
| 30 | 1.2 | 23.81 | 4.54 | 88.85 | 5.22 | 100.00 |
| 40 | 1.93 | 38.29 | 5 | 97.85 | 5.22 | 100.00 |
| 60 | 2.4 | 47.62 | 5.11 | 100.00 | 5.22 | 100.00 |
| 120 | 5.04 | 100.00 | 5.11 | 100.00 | 5.22 | 100.00 |

TABLE 4

Breaker Compound Used: 70% Glycolic acid

Diluted To:

| Time, min | 17.5 True Conc. cm clear fluid | % of Total | 35% True Conc. cm clear fluid | % of Total | 52.5% True Conc. cm clear fluid | % of Total |
|---|---|---|---|---|---|---|
| Test Temperature: 75° F. | | | | | | |
| 4 | 0.41 | 7.45 | 0.33 | 6.00 | 0.67 | 12.18 |
| 10 | 0.48 | 8.73 | 0.74 | 13.45 | 1.16 | 21.09 |
| 15 | 0.62 | 11.27 | 1 | 18.18 | 1.42 | 25.82 |
| 20 | 0.62 | 11.27 | 1.13 | 20.55 | 1.64 | 29.82 |
| 30 | 0.58 | 10.55 | 1.58 | 28.73 | 2.12 | 38.55 |
| 40 | 0.78 | 14.18 | 1.95 | 35.45 | 2.61 | 47.45 |
| 60 | 0.79 | 14.36 | 2.68 | 48.73 | 3.47 | 63.09 |
| 120 | 0.85 | 15.45 | 4.67 | 84.91 | 5.27 | 95.82 |
| Test Temperature: 140° F. | | | | | | |
| 4 | 0.3 | 5.45 | 0.78 | 14.18 | 1.16 | 21.09 |
| 10 | 0.43 | 7.82 | 1.31 | 23.82 | 1.7 | 30.91 |
| 15 | 0.6 | 10.91 | 1.92 | 34.91 | 2.75 | 50.00 |
| 20 | 0.6 | 10.91 | 2.85 | 51.82 | 4.05 | 73.64 |
| 30 | 0.6 | 10.91 | 4.4 | 80.00 | 4.73 | 86.00 |
| 40 | 0.66 | 12.00 | 4.4 | 80.00 | 5.33 | 96.91 |
| 60 | 0.86 | 15.64 | 5.55 | 100.91 | 5.5 | 100.00 |
| 120 | 1.3 | 23.64 | 5.55 | 100.91 | 5.5 | 100.00 |
| Test Temperature: 180° F. | | | | | | |
| 4 | 0.3 | 5.45 | 0.78 | 14.18 | 1.16 | 21.09 |
| 10 | 0.43 | 7.82 | 1.31 | 23.82 | 1.7 | 30.91 |
| 15 | 0.6 | 10.91 | 1.92 | 34.91 | 2.75 | 50.00 |
| 20 | 0.6 | 10.91 | 2.85 | 51.82 | 4.05 | 73.64 |
| 30 | 0.6 | 10.91 | 4.4 | 80.00 | 4.73 | 86.00 |
| 40 | 0.66 | 12.00 | 4.4 | 80.00 | 5.33 | 96.91 |
| 60 | 0.86 | 15.64 | 5.55 | 100.91 | 5.5 | 100.00 |
| 120 | 1.3 | 23.64 | 5.55 | 100.91 | 5.5 | 100.00 |
| Test Temperature: 220° F. | | | | | | |
| 4 | 0.35 | 6.67 | 1.09 | 20.30 | 1.28 | 24.52 |
| 10 | 0.65 | 12.38 | 2.19 | 40.78 | 4.32 | 82.76 |
| 15 | 1.04 | 19.81 | 2.91 | 54.19 | 5.2 | 99.62 |
| 20 | 1.04 | 19.81 | 4.28 | 79.70 | 5.22 | 100.00 |
| 30 | 1.15 | 21.90 | 5.36 | 99.81 | 5.22 | 100.00 |
| 40 | 1.16 | 22.10 | 5.36 | 99.81 | 5.22 | 100.00 |
| 60 | 1.35 | 25.71 | 5.37 | 100.00 | 5.22 | 100.00 |
| 120 | 5.25 | 100.00 | 5.37 | 100.00 | 5.22 | 100.00 |

TABLE 5

Breaker Compound Used: 50% Gluconic acid

Diluted to:

| Time, min | 12.5% True Conc. cm clear fluid | % of Total | 25% True Conc. cm clear fluid | % of Total |
|---|---|---|---|---|
| Test Temperature: 140° F. | | | | |
| 4 | 0.1 | 1.92 | 0.34 | 6.51 |
| 10 | 0.4 | 7.66 | 1.13 | 21.65 |
| 15 | 0.4 | 7.66 | 1.15 | 22.03 |
| 20 | 0.4 | 7.66 | 1.15 | 22.03 |
| 30 | 0.46 | 8.81 | 1.44 | 27.59 |
| 40 | 0.63 | 12.07 | 1.78 | 34.10 |
| 60 | 0.64 | 12.26 | 2.44 | 46.74 |
| 120 | 5.22 | 100.00 | 5.22 | 100.00 |
| Test Temperature: 180° F. | | | | |
| 4 | 0.35 | 6.43 | 0.43 | 9.23 |
| 10 | 0.37 | 6.80 | 0.86 | 18.45 |
| 15 | 0.37 | 6.80 | 1.15 | 24.68 |

TABLE 5-continued

Breaker Compound Used: 50% Gluconic acid

| 20 | 0.37 | 6.80 | 1.32 | 28.33 |
|---|---|---|---|---|
| 30 | 0.58 | 10.66 | 2.23 | 47.85 |
| 40 | 0.64 | 11.76 | 3.23 | 69.31 |
| 60 | 0.73 | 13.42 | 4.66 | 100.00 |
| 120 | 5.44 | 100.00 | 4.66 | 100.00 |

Test Temperature: 220° F.

| | Diluted to: | | | |
|---|---|---|---|---|
| | 25% True Conc. | | 50% True Conc. | |
| Time, min | cm clear fluid | % of Total | cm clear fluid | % of Total |
| 4 | 4.67 | 92.48 | 5.14 | 99.61 |
| 10 | 5 | 99.01 | 5.16 | 100.00 |
| 15 | 5.05 | 100.00 | 5.16 | 100.00 |
| 20 | 5.05 | 100.00 | 5.16 | 100.00 |
| 30 | 5.05 | 100.00 | 5.16 | 100.00 |
| 40 | 5.05 | 100.00 | 5.16 | 100.00 |
| 60 | 5.05 | 100.00 | 5.16 | 100.00 |
| 120 | 5.05 | 100.00 | 5.16 | 100.00 |

TABLE 6

Breaker Compound Used: Downhole Maleic Acid Solution

| | Diluted To: | | | | | |
|---|---|---|---|---|---|---|
| | 15% True Conc. | | 30% True Conc. | | 50% True Conc. | |
| Time, min | cm clear fluid | % of Total | cm clear fluid | % of Total | cm clear fluid | % of Total |
| Test Temperature: 75° F. | | | | | | |
| 4 | 0.25 | 7.69 | 0.465 | 14.31 | 0.505 | 15.30 |
| 10 | 0.45 | 13.85 | 0.66 | 20.31 | 0.82 | 24.85 |
| 15 | 0.535 | 16.46 | 0.955 | 29.38 | 1.125 | 34.09 |
| 20 | 0.7 | 21.54 | 1.16 | 35.69 | 1.385 | 41.97 |
| 30 | 1 | 30.77 | 1.5 | 46.15 | 1.95 | 59.09 |
| 40 | 1.27 | 39.08 | 1.925 | 59.23 | 2.35 | 71.21 |
| 60 | 1.65 | 50.77 | 2.7 | 83.08 | 3.3 | 100.00 |
| 120 | 3.2 | 98.46 | 3.25 | 100.00 | 3.3 | 100.00 |
| Test Temperature: 140° F. | | | | | | |
| 4 | 0.4 | 11.59 | 0.75 | 22.39 | 1.7 | 50.75 |
| 10 | 0.85 | 24.64 | 1.3 | 38.81 | 2.1 | 62.69 |
| 15 | 1.1 | 31.88 | 1.8 | 53.73 | 2.3 | 68.66 |
| 20 | 1.35 | 39.13 | 2.2 | 65.67 | 2.5 | 74.63 |
| 30 | 2 | 57.97 | 3.35 | 100.00 | 2.8 | 83.58 |
| 40 | 2.4 | 69.57 | 3.35 | 100.00 | 3.1 | 92.54 |
| 60 | 3.35 | 97.10 | 3.35 | 100.00 | 3.35 | 100.00 |
| 120 | 3.45 | 100.00 | 3.35 | 100.00 | 3.35 | 100.00 |
| Test Temperature: 180° F. | | | | | | |
| 4 | 0.5 | 14.71 | 0.65 | 19.40 | 1 | 28.57 |
| 10 | 0.85 | 25.00 | 1.55 | 46.27 | 2.75 | 78.57 |
| 15 | 1.35 | 39.71 | 2.35 | 70.15 | 3.5 | 100.00 |
| 20 | 1.7 | 50.00 | 3.1 | 92.54 | 3.5 | 100.00 |
| 30 | 2.35 | 69.12 | 3.35 | 100.00 | 3.5 | 100.00 |
| 40 | 3.4 | 100.00 | 3.35 | 100.00 | 3.5 | 100.00 |
| 60 | 3.4 | 100.00 | 3.35 | 100.00 | 3.5 | 100.00 |
| 120 | 3.4 | 100.00 | 3.35 | 100.00 | 3.5 | 100.00 |

EXAMPLE 2

To determine the effectiveness of each acid in restoring permeability to a formation, permeability restoration tests were conducted using natural berea sandstone core samples. The details of the test using the downhole maleic acid solution of the current invention are reported in Table 7 while the results of the permeability tests for the other acids tested in Example 1 are compared in Table 8. As shown by Table 8, some of the acids that exhibited good static break tests results performed poorly in the permeability restoration tests. The testing procedures used for the other acids reported in Table 8 were identical to or substantially similar to the procedure detailed in Table 7.

Each test was performed using cores having diameters of approximately 2.38 cm diameter and lengths of 7.0 to 9.0 cm. The cores were vacuum-saturated in filtered API brine (the brine used throughout this procedure). A single core was then mounted in a Hassler sleeve device. The flow direction, from the bottom to the top of the core was designated as the production direction, and flow from top to bottom represented the treatment direction. A hollow spacer ring was installed above the core to act as a perforation cavity. Overburden pressure on the Hassler Sleeve was administered as required by the differential treating pressures being used. The core was then heated to the test temperature of 140° F. and kept there throughout the test. The core was then flushed with 100 mL of filtered API brine in the production direction. Following the brine flush, an initial permeability to API brine was determined in the production direction. The differential pressure during the permeability test was 20 psi. Permeability rates were measured at every 25 mL of throughput. For the maleic acid test, the results of the initial permeability test are reported in the section entitled Initial Brine Flow Step of Table 7.

Following the permeability test, the top mandrel was removed and 6 to 8 mL of K-MAX brand CFLA was poured into the hollow ring above the core. The Hassler sleeve was then reassembled and the remainder of the gel dispersion poured into the fluid reservoir and placed under sufficient pressure to fill all lines and valves. A high differential pressure was placed across the core in the treatment direction. Table 7 reports the differential pressure applied to the CFLA under the Pressure Test Step. The pressure step data demonstrates the effectiveness of the HEC-based CFLA in precluding fluid flow through the core sample. As reported, the permeability of the core sample treated with the HEC-based CFLA had a permeability of 0.01 milliDarcies. Following completion of the pressurization step with the CFLA, the pressure was relieved.

Following the pressurization step, the core sample corresponds to a subterranean formation following treatment with a HEC-based CFLA. To simulate permeability restoration, the core is then treated with the various acids. The acid treatment of the core samples took place in four steps; however, the downhole treatment process may vary from location to location and even from formation to formation.

In this example, the first and second acid treatment steps were flushes of the core face with the desired acid. In each step, 50 mL of acid remained in contact with the face for 15 minutes. In the third step, 25 mL of acid was injected through the core and allowed to soak for 30 minutes. In the fourth step, 25 mL of acid was injected through the core and allowed to soak for 60 minutes. Each step occurred at a temperature of 140° F.

Upon completion of the acid treatment steps, the permeability of the core was once again measured by injecting 1000 mL of API brine through the core in the production direction, as in the first step. Once again the differential pressure was 20 psi. Permeability rates were measured every at 25 mL of throughput. The permeability of the core was measured during the injection of the API brine. As reported in the Secondary Brine Flow section of Table 7, treatment the core sample treated with the downhole maleic acid solution had a final fluid permeability of 274.38 milliDarcies or 88.89 percent of the original fluid permeability. Clearly, the downhole maleic acid solution provides a highly effective means for restoring fluid flow permeability to formations that have been treated with HEC-based CFLA.

TABLE 7

| Type Gel: | K-MAX brand CFLA In 5% $CaCl_2$ Brine |
|---|---|
| Concentration: | 120 lb/1000 gal |
| Test Temp: | 140° F. |
| Overburden Pressure: | 1000 psi |
| Core Material: | Natural berea: preacidized |
| Core Length (cm): | 6.9 |
| Core Diameter (cm): | 2.38 |
| Flow Area (sq. cm): | 4.44882 |

INITIAL BRINE FLOW STEP
(Production Direction) - Brine Saturation Step
Brine Injected: API Brine
Viscosity At test temp. = 0.78 Cp

| Incremental Volume (mL) | Cumulative Volume (mL) | Time (Sec.) | Flow Rate (mL/sec.) | Pressure (Atm.) | Permeability (mD) |
|---|---|---|---|---|---|
| 25 | 25 | 141 | 0.18 | 1.360822 | 157.62 |
| 25 | 50 | 74 | 0.34 | 1.360822 | 300.33 |
| 25 | 75 | 89 | 0.28 | 1.360822 | 249.72 |
| 25 | 100 | 94 | 0.27 | 1.360822 | 236.43 |
| 25 | 125 | 88 | 0.28 | 1.360822 | 252.55 |
| 25 | 150 | 82 | 0.3 | 1.360822 | 271.03 |
| 25 | 175 | 80 | 0.31 | 1.360822 | 277.81 |
| 25 | 200 | 77 | 0.32 | 1.360822 | 288.63 |
| 25 | 225 | 71 | 0.35 | 1.360822 | 313.03 |
| 25 | 250 | 74 | 0.34 | 1.360822 | 300.33 |
| 25 | 275 | 76 | 0.33 | 1.360822 | 292.43 |
| 25 | 300 | 73 | 0.34 | 1.360822 | 304.45 |
| 25 | 325 | 72 | 0.35 | 1.360822 | 308.68 |
| 25 | 350 | 73 | 0.34 | 1.360822 | 304.45 |
| 25 | 375 | 71 | 0.35 | 1.360822 | 313.03 |
| 25 | 400 | 70 | 0.36 | 1.360822 | 317.5 |
| 25 | 425 | 70 | 0.36 | 1.360822 | 317.5 |
| 25 | 450 | 71 | 0.35 | 1.360822 | 313.03 |
| 25 | 475 | 72 | 0.35 | 1.360822 | 308.68 |
| 25 | 500 | 72 | 0.35 | 1.360822 | 308.68 |
|   |   |   |   | Final stable permeability | 308.68 mD |

PRESSURE TEST STEP (Treatment direction)

| Time (min.) | Incremental Volume (mL) | Cumulative Volume (mL) | mL/min. | ML/sec. | Pressure (Atm.) | Permeability To Water (mD) |
|---|---|---|---|---|---|---|
| 0 | 0 | 0 | 0 | 0 | 40.82466 | 0 |
| 1 | 0.5 | 0.5 | 0.5 | 0.01 | 40.82466 | 0.25 |
| 5 | 1.4 | 1.9 | 0.35 | 0.01 | 40.82466 | 0.17 |
| 10 | 0.5 | 2.4 | 0.1 | 0 | 40.82466 | 0.05 |
| 20 | 0.7 | 3.1 | 0.07 | 0 | 40.82466 | 0.03 |
| 30 | 0.4 | 3.5 | 0.04 | 0 | 40.82466 | 0.02 |
| 40 | 0.5 | 4 | 0.05 | 0 | 40.82466 | 0.02 |
| 50 | 0.2 | 4.2 | 0.02 | 0 | 40.82466 | 0.01 |
| 60 | 0.3 | 4.5 | 0.03 | 0 | 40.82466 | 0.01 |
| 120 | 1.4 | 5.9 | 0.02 | 0 | 40.82466 | 0.01 |
| 180 | 0.7 | 6.6 | 0.02 | 0 | 40.82466 | 0.01 |
| 240 | 0.8 | 7.4 | 0.01 | 0 | 40.82466 | 0.01 |

Removal of HEC-Based CFLA
Overflush Breaker Application (Treatment Direction 140° F.)
1. Flush 50 mL of 50% Maleic acid across the face of the core. Soak for 15 min.
2. Flush a second 50 mL of 50% Maleic acid across face of the core, soak 15 min.
3. Inject 25 mL of 50% Maleic through the core. Soak for 30 min. @ 140° F.
4. Inject 25 mL more of 50% Maleic through the core. Soak for 60 min. @ 140° F.

TABLE 7-continued

Permeability Restoration Test:
Secondary Brine Flow Step (Production Direction)

| Incremental Volume (mL) | Cumulative Volume (mL) | Time (sec) | Flow Rate (mL/sec.) | Pressure (Atm.) | Permeability (mD) |
|---|---|---|---|---|---|
| 25 | 525 | 81 | 0.31 | 1.360822 | 274.38 |
| 25 | 550 | 82 | 0.3 | 1.360822 | 271.03 |
| 25 | 575 | 81 | 0.31 | 1.360822 | 274.38 |
| 25 | 600 | 81 | 0.31 | 1.360822 | 274.38 |
| 25 | 625 | 80 | 0.31 | 1.360822 | 277.81 |
| 25 | 650 | 81 | 0.31 | 1.360822 | 274.38 |
| 25 | 675 | 81 | 0.31 | 1.360822 | 274.38 |
| 25 | 700 | 80 | 0.31 | 1.360822 | 277.81 |
| 25 | 725 | 81 | 0.31 | 1.360822 | 274.38 |
| 25 | 750 | 82 | 0.3 | 1.360822 | 271.03 |
| 25 | 775 | 81 | 0.31 | 1.360822 | 274.38 |
| 25 | 800 | 80 | 0.31 | 1.360822 | 277.81 |
| 25 | 825 | 81 | 0.31 | 1.360822 | 274.38 |
| 25 | 850 | 80 | 0.31 | 1.360822 | 277.81 |
| 25 | 875 | 80 | 0.31 | 1.360822 | 277.81 |
| 25 | 900 | 81 | 0.31 | 1.360822 | 274.38 |
| 25 | 925 | 81 | 0.31 | 1.360822 | 274.38 |
| 25 | 950 | 80 | 0.31 | 1.360822 | 277.81 |
| 25 | 975 | 80 | 0.31 | 1.360822 | 277.81 |
| 25 | 1000 | 81 | 0.31 | 1.360822 | 274.38 |
|   |   | Final Regained Permeability = 274.38 mD | | | |
|   |   | % Regained Permeability = 88.89% | | | |

TABLE 8

| Acid | Concentration Range | Temperature Range ° F. | Degree of Effectiveness | Damage potential * |
|---|---|---|---|---|
| HCl | 5 to 15% | 75-220 | Highly effective | Very high |
| Acetic | 25 to 75% | 75-180 | Minimal | Very Low |
| Formic | 22 to conc. | 75 to 220 | Minimal | Low |
| Glycolic | 17 to 53% | 75-220 | Minimal | Very Low |
| Gluconic | 12.5 to 50% | 140 to 220 | Minimal | Very Low |
| Maleic | 15 to 40% | 75-180 | Highly effective | Very Low |

* Damage potential when reacted with HCl-sensitive zeolite clays

EXAMPLE 3

To determine the likelihood of formation damage resulting from the use of a particular acid, tests were performed using a sample of analcime (a zeolite mineral particularly vulnerable to HCl acid damage). This test determines the degree of dissolution of aluminum and sodium by the acid. The dissolution of aluminum and sodium by the acid is an indicator of the likely precipitation of a silica gel in the pores of the formation by the acid. The following gel breaking solutions were tested: 15% HCl, 25% acetic acid, 12.5% acetic acid, 25% maleic acid, 12.5% maleic acid and CLAYSAFE H gel breaking solution, a solution containing 5% HCl and 10% acetic acid available from Halliburton Energy Services, Inc.

Each test was conducted according to the following procedure:
1. Weigh 1.0 gm of analcime mineral into each of 6 glass jars.
2. Measure 25 mL of the acid solution to be tested into the separate jars.
3. Swirl each jar to mix, and place into a 150° F. temperature bath to react for 8 hours.
4. Remove jars from the bath and filter the contents.
5. Analyze the filtrate for the presence of Al, Fe, K, Mg, Na, & Si.

The results reported in FIG. 1, clearly demonstrate that the downhole maleic acid solution has substantially less potential to damage the formation than either 15% HCl or CLAYSAFE H™ gel breaking solution. Although acetic acid is not likely to damage the formation, the test results reported in Examples 1 and 2 demonstrate that acetic acid is not effective in removing CFLA from a subterranean formation.

Clearly, the downhole maleic acid solution of the current invention provides a substantial improvement over currently available acid solutions for removing HEC-based CFLA. Further, the methods of the current invention for restoring fluid permeability to a subterranean formation treated with HEC-based CFLA provide a significant advance in the art of hydrocarbon production from subterranean formations.

While the present invention has been described with reference to the preferred embodiments and the examples other embodiments of the current invention will be apparent to those skilled in the art. Therefore, the foregoing specification is considered exemplary with the true scope and spirit of the invention being indicated by the following claims.

What is claimed is:

1. A solution having a density of about 8 pounds per gallon to about 14 pounds per gallon for removing HEC-based CFLA from a subterranean formation, the solution comprising:
   a maleic acid solution comprising water;
   a performance-enhancing agent that comprises sodium perborate; and
   at least one salt selected for its ability to preclude water take up by the subterranean formation.

2. The solution of claim 1, wherein the concentration of maleic acid in the maleic acid solution is from about 10 to about 40 percent by weight.

3. The solution of claim 1, wherein the performance-enhancing agent is present in an amount in the range of from about 1 to about 3 percent by weight of the solution.

4. The solution of claim 1, wherein said salt is selected from the group consisting of sodium chloride, calcium chloride, ammonium chloride, magnesium chloride, calcium bromide, potassium bromide, and potassium chloride.

5. The solution of claim 1, wherein said water comprises at least one member selected from the group consisting of seawater and brines.

6. The solution of claim 1, wherein the water is a brine and the brine comprises at least one member selected from the group consisting of potassium chloride, calcium bromide, sodium chloride, sodium bromide, and calcium chloride.

7. A solution having a density of about 8 pounds per gallon to about 14 pounds per gallon for removing HEC-based CFLA from a subterranean formation, the solution comprising:
   a maleic acid solution comprising water wherein the concentration of maleic acid in the maleic acid solution is from about 10 to about 50 percent by weight;
   at least one salt selected for its ability to preclude water take up by the subterranean formation; and
   a performance-enhancing agent that comprises a compound that is capable of lowering the pH of the solution and/or an oxidizing agent.

8. The solution of claim 7 wherein the performance-enhancing agent is hydrochloric acid and/or the oxidizing agent is sodium perborate.

9. The solution of claim 7, wherein said salt capable of precluding water take up by the subterranean formation is selected from the group consisting of sodium chloride, calcium chloride, ammonium chloride, magnesium chloride, calcium bromide, potassium bromide, and potassium chloride.

10. The solution of claim 7, wherein said water comprises at least one member selected from the group consisting of seawater and brines.

11. The solution of claim 7, the water is a brine and the brine comprises at least one member selected from the group consisting of potassium chloride, calcium bromide, sodium chloride, sodium bromide, and calcium chloride.

12. A solution having a density of about 8 pounds per gallon to about 14 pounds per gallon for removing HEC-based CFLA from a subterranean formation, the solution comprising:
   a maleic acid solution comprising water, wherein the concentration of maleic acid in the maleic acid solution is from about 5 to about 50 percent by weight;
   at least one salt selected from the group consisting of sodium chloride, calcium chloride, ammonium chloride, magnesium chloride, calcium bromide, potassium bromide, potassium chloride, and mixtures thereof, wherein the concentration of the salt in the solution is at least 7 percent by weight; and
   a performance-enhancing agent that is selected from the group consisting of hydrochloric acid and sodium perborate, wherein the concentration of the performance-enhancing agent in the solution is from about 1 to about 3 percent by weight.

13. The solution of claim 12, wherein said water comprises at least one member selected from the group consisting of seawater and brines.

14. A method for removing HEC-based CFLA from a subterranean formation, the method comprising:
   preparing a downhole maleic acid solution comprising water;
   adjusting the density of the downhole maleic acid solution to a density at least equal to the HEC-based CFLA;
   contacting the HEC-based CFLA with the maleic acid solution; and,
   allowing the downhole maleic acid solution to remain in contact with the HEC-based CFLA for a period of time sufficient to at least partially restore fluid permeability to the subterranean formation.

15. The method of claim 14, further comprising adding a performance-enhancing agent to the downhole maleic acid solution.

16. The method of claim 15, wherein the performance-enhancing agent comprises at least one member selected from the group consisting of hydrochloric acid and sodium perborate.

17. The method of claim 14, wherein adjusting the density of the downhole maleic acid solution comprises adding a compound that comprises at least one member selected from the group consisting of sodium chloride, calcium chloride, ammonium chloride, magnesium chloride, calcium bromide, potassium bromide, and potassium chloride.

18. The method of claim 14, wherein said downhole maleic acid solution comprises from about 10 percent to about 40 percent maleic acid by weight.

19. The method of claim 14, wherein the water in the downhole maleic acid solution comprises at least one member selected from the group consisting of fresh water, seawater, and brines.

20. The method of claim 14, wherein the downhole maleic acid solution remains in contact with the HEC-based CFLA for a period of time sufficient to restore at least 70 percent of the original fluid permeability of the subterranean formation.

21. The method of claim 14, wherein the downhole maleic acid solution remains in contact with the HEC-based CFLA for a period of time sufficient to restore at least 85 percent of the original fluid permeability of the subterranean formation.

* * * * *